(12) United States Patent
Theisen et al.

(10) Patent No.: US 8,478,323 B2
(45) Date of Patent: Jul. 2, 2013

(54) METHOD AND APPARATUS FOR DYNAMICALLY ENABLING A DIRECT MODE OPERATION GATEWAY

(75) Inventors: Nanna Svane Theisen, Dragoer (DK); Raul E. Carpio, Basingstoke (GB); Mark E. Edwards, Reading (GB)

(73) Assignee: Motorola Solutions, Inc., Schaumburg, IL (US)

( * ) Notice: Subject to any disclaimer, the term of this patent is extended or adjusted under 35 U.S.C. 154(b) by 387 days.

(21) Appl. No.: 12/972,705

(22) Filed: Dec. 20, 2010

(65) Prior Publication Data
US 2012/0157146 A1 Jun. 21, 2012

(51) Int. Cl.
*H04Q 7/20* (2006.01)

(52) U.S. Cl.
USPC ..... 455/517; 455/500; 455/426.1; 455/67.11; 455/432.1; 455/11.1; 370/312; 370/315; 370/341; 370/340; 370/310

(58) Field of Classification Search
USPC ............... 455/517, 500, 426.1, 426.2, 422.1, 455/403, 67.11, 561, 507, 520, 432.1, 432.3, 455/456.1–457, 421, 550.1, 7, 11.1; 370/312, 370/315, 310, 327, 329, 328, 340, 341, 343, 370/338
See application file for complete search history.

(56) References Cited

U.S. PATENT DOCUMENTS

| | | | |
|---|---|---|---|
| 2004/0190468 A1* | 9/2004 | Saijonmaa | 370/312 |
| 2008/0219214 A1 | 9/2008 | Chen et al. | |
| 2010/0142434 A1* | 6/2010 | Rodmell et al. | 370/315 |

FOREIGN PATENT DOCUMENTS

| | | |
|---|---|---|
| EP | 1538854 A2 | 6/2005 |
| EP | 2180741 A1 | 4/2010 |
| GB | 2408894 A | 6/2005 |
| GB | 2409129 A | 6/2005 |

OTHER PUBLICATIONS

PCT International Search Report Dated Feb. 16, 2012 for Counterpart Application.

* cited by examiner

*Primary Examiner* — Keith Ferguson
(74) *Attorney, Agent, or Firm* — Anthony P. Curtis; Daniel R. Bestor

(57) ABSTRACT

A method and apparatus is disclosed for dynamically activating gateway functions on a communication device which is operating in trunked mode. The communication device calculates an estimated probability that at least one associated communication device is out of a network coverage area. The communication device determines that the associated communication device is inaccessible or is operating in an operating mode consisting of a trunked mode or a direct mode when the estimated probability is calculated to be at or below a predefined threshold. The communication device automatically activates its gateway functions and is configured to function as a direct mode gateway for at least one associated communication device when it determines that the associated communication device is operating in the direct mode.

20 Claims, 3 Drawing Sheets

METHOD AND APPARATUS FOR DYNAMICALLY ENABLING A DIRECT MODE OPERATION GATEWAY

FIELD OF THE DISCLOSURE

The present disclosure relates generally to using a Direct Mode Operation (DMO) gateway and more particularly to dynamically enabling DMO gateway functions in a radio operating in trunked mode.

BACKGROUND

Terrestrial Trunk Radio (TETRA) is a global standard for radio communications on private/professional mobile radios. Professional mobile radios include radios, other than mobile telephones, such as mobile radios, portable radios, and the like. TETRA supports a trunked mode operation (TMO) and a direct mode operation (DMO). In the trunked mode, radios use network infrastructure, such as base stations, to communicate with each other. In direct mode, on the other hand, radios communicate directly with other radios within a limited coverage area, without using the network infrastructure. DMO is often used in situations where access to the TETRA network infrastructure is limited or unavailable.

A TETRA network coverage area is configured to include a predefined geographical area. In order to support radios outside of the network coverage area, some radios may be configured to include DMO gateway functions. These radios are herein referred to as DMO gateways. A DMO gateway includes additional capabilities for connecting associated radios, operating in the direct mode outside of the network coverage area, to the network infrastructure. As such, the DMO gateway is the connection between trunked network devices, such as radios and base stations, and radios operating in the direct mode outside the network coverage area. For example, a mobile radio in a police vehicle may be configured to connect associated radios, such as portable radios used by police officers assigned to the police vehicle, to the network infrastructure, when the portable radios are outside of the network coverage area. Accordingly, if the mobile radio in the police vehicle is in a geographical location close the boundary of the network coverage area, and if the police officer moves to a location outside of the network coverage area, the police officer may still communicate with, for example a central dispatch center or other radios on the trunked network, by sending information directly from a portable radio to the mobile radio (DMO gateway). The DMO gateway may thereafter transmit the information to other network devices through the network infrastructure.

By default, a radio configured to function as a DMO gateway is generally set up to operate in trunked mode. In order for the radio to function as a DMO gateway, a DMO gateway mode must be manually activated by, for example flipping a switch on the radio. When the DMO gateway mode is not activated, radios associated with the DMO gateway will be unable to communicate directly with the DMO gateway.

In some situations, there may be multiple DMO gateways in a given location. There is a possibility of these DMO gateways attempting to use the same DMO channel, which may lead to interference. For example, during an emergency there may be multiple police vehicles, each with its mobile radio configured to function as a DMO gateway in a given location. If, the DMO functions for two or more mobile radios are activated when sufficiently close to each other, there is likely to be interference when these DMO gateways attempt to use the same DMO channel.

Accordingly, there is a need for a method and apparatus for dynamically enabling a DMO gateway and for minimizing potential interference between DMO gateways.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
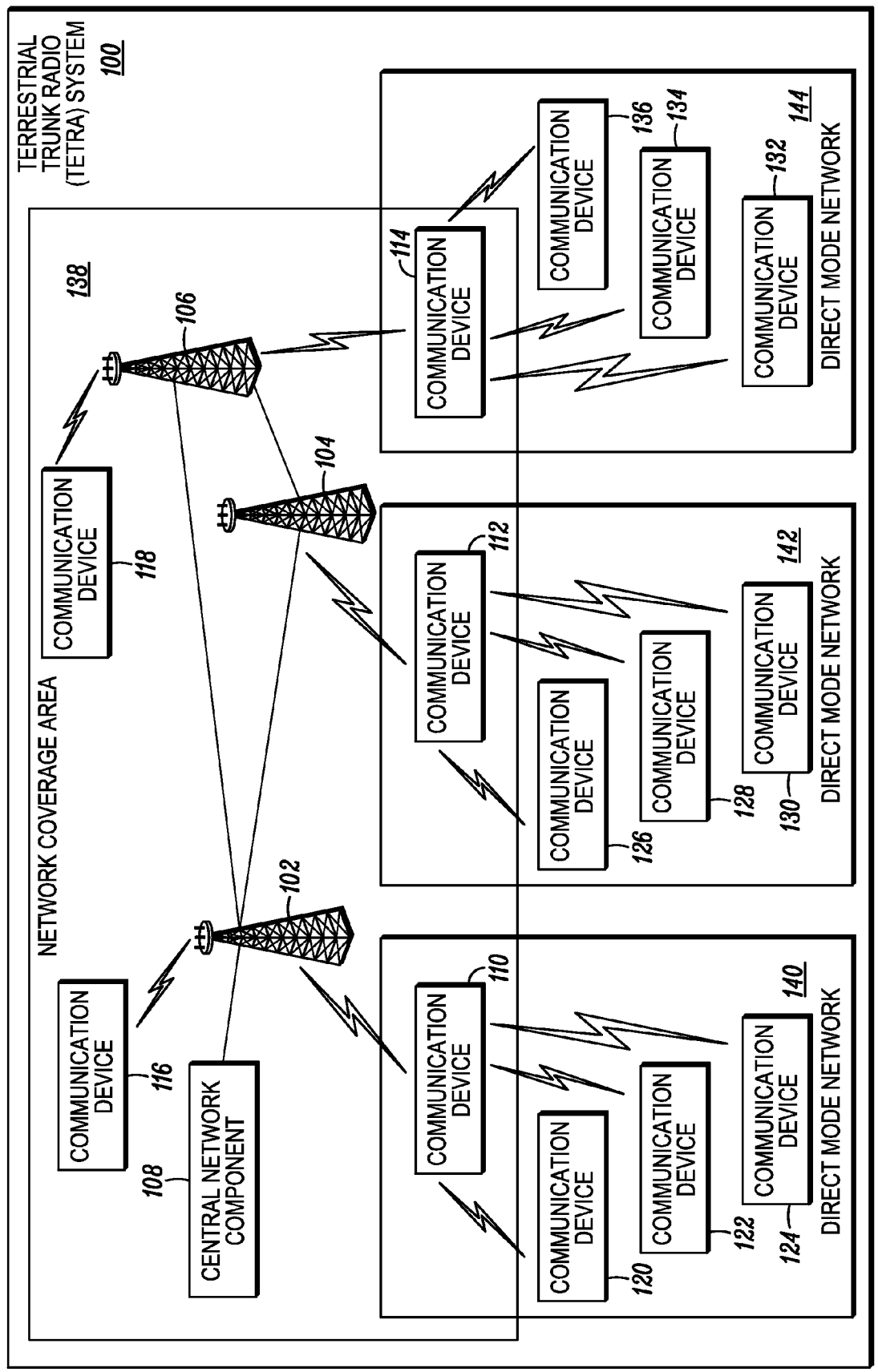
FIG. 1 is a block diagram of a Terrestrial Trunk Radio (TETRA) system 100 used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Methods and apparatuses are presented for dynamically activating gateway functions on a communication device operating in a trunked mode. The communication device calculates an estimated probability that at least one associated communication device is out of a network coverage area. The communication device determines that the associated communication device is inaccessible or is operating in an operating mode consisting of a trunked mode or a direct mode when the estimated probability is calculated to be at or below a predefined threshold. The communication device automatically activates its gateway functions and is configured to function as a direct mode gateway for at least one associated communication device when it determines that the associated communication device is operating in the direct mode.

FIG. 1 is a block diagram of a Terrestrial Trunk Radio (TETRA) system 100 used in accordance with some embodiments. TETRA system 100 includes communication devices 110-136, such as mobile radios (personal or vehicular), laptops, PDAs, or similar radios configured to operate in trunked mode (TMO) and/or direct mode (DMO). When in trunked mode, communication devices 110-136 communicate with each other and/or with a central network component, such as a dispatch control center 108, by transmitting and receiving voice/data traffic and control/signaling streams through network infrastructure devices, such as base stations 102-106. When in direct mode, central network component 108 and communication devices 110-136 communicate directly with each other.

One or more communication devices, for example communication devices 110-114, are configured to operate in trunked mode as TMO radios or in direct mode as DMO gateways. As a DMO gateway, each of communication devices 110-114 communicates directly with an associated communication device when the associated communication device moves out of a predefined network coverage area 138. For example, when communication device 110 functions as a DMO gateway for communication devices 120-124, communication device 110 communicates directly with communication devices 120-124 when these devices leave network coverage area 138; when communication device 112 functions as a DMO gateway for communication devices 126-130, communication device 112 communicates directly with communication devices 126-130 when these devices leave network coverage area 138; and when communication device 114 functions as a DMO gateway for communication devices 132-136, communication device 114 communicates directly with communication devices 132-136 when these devices leave network coverage area 138. Each DMO gateway can communicate directly with associated communication devices in a predefined DMO coverage area. For example, when functioning as a DMO gateway, communication device 110 communicates directly with associated communication devices 120-124 in DMO coverage area 140, communication device 112 communicates directly with associated communication devices 126-130 in DMO coverage area 142, and communication device 114 communicates directly with associated communication devices 132-136 in DMO coverage area 144. It should be apparent to one skilled in the art that other components and configurations of TETRA system 100 are not shown for the sake of simplicity.

Figure 2:
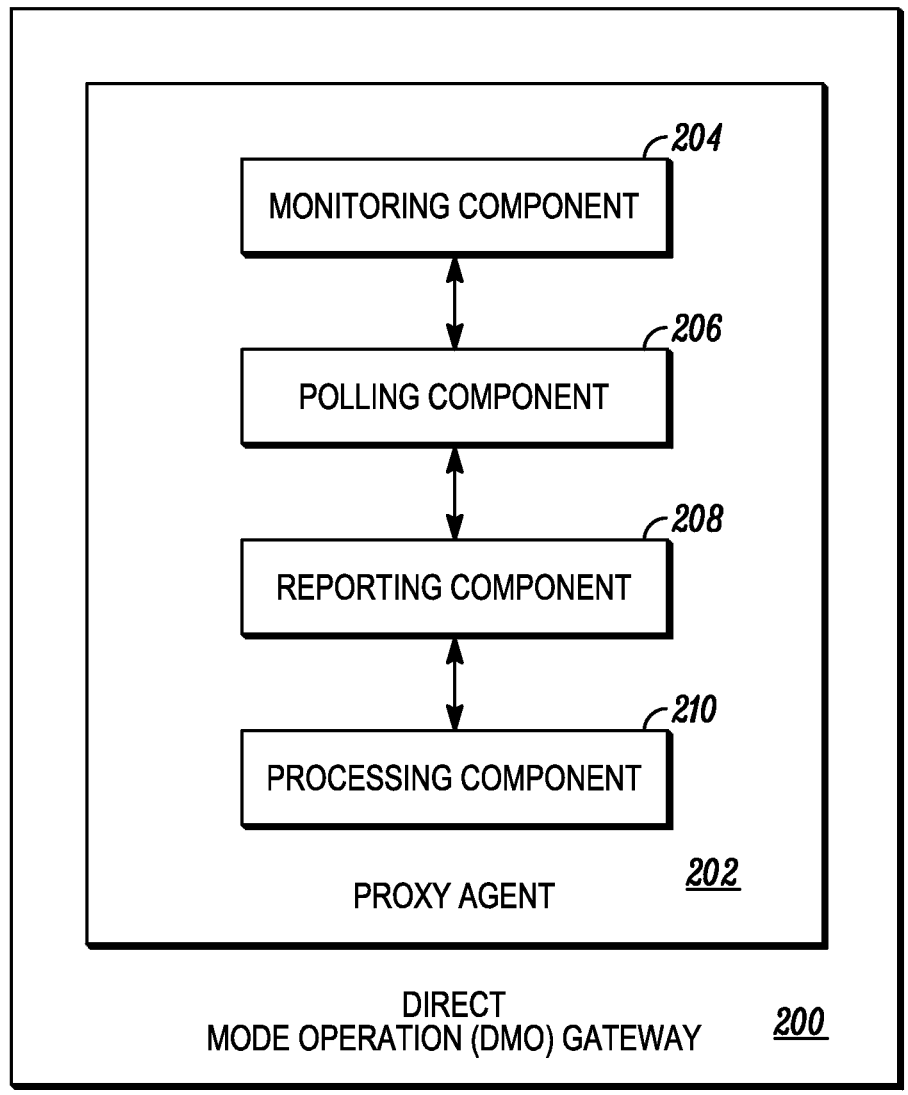
FIG. 2 is a block diagram of a Direct Mode Operation (DMO) gateway used in accordance with some embodiments.

FIG. 2 is a block diagram of a Direct Mode Operation (DMO) gateway used in accordance with some embodiments. DMO gateway 200 may be, for example, TMO communication devices 110, 112 and 114 of FIG. 1. In order to function as a DMO gateway, a TMO communication device is configured to determine when an associated communication device is likely to be out of the network coverage area. In some embodiments, an associated communication device is determined to likely be out of the network coverage area when a receive signal strength indicator (RSSI) for the TMO communication device falls within a predefined range. The RSSI within the predefined range is used to indicated that the TMO communication device is about to move out of the network coverage area. For example, if the RSSI for the TMO communication device is at or below a predefined threshold which indicates that the TMO communication device is in an area close to the boundary of the network coverage area, the TMO communication device is configured to determine that an associated communication device is likely to be out of the network coverage area. This is because the associated communication device has lower power than the TMO communication device. For example, if the power for the associated communication device is about one watt, the power for the TMO communication device may be about three watts. Therefore, although the associated communication device and the TMO communication device can detect the RSSI from the base station when they are co-located, the associated communication device has less available power to transmit its signals back to the base station. It is this inability for the associated communication device to send signals back to the base station that causes it to lose network coverage. Therefore, in some embodiments, when the TMO communication device is in an area close to the boundary of the network coverage area where the transmit signal strength from the TMO communication device is diminished, the associated communication device is likely to be out of the network coverage area.

It should be noted that the associated communication device may switch to direct mode operation for reasons other than lack of network coverage. Therefore, establishing that the TMO communication device is in an area close to the boundary of the network coverage area is only one technique for determining that the associated communication device might be operating in direct mode. Other techniques may be used for determining if the associated communication device might be operating in direct mode. Upon confirming that at least one associated communication device is out of the network coverage area, the TMO communication device is configured to automatically switch from functioning as a TMO communication device to functioning as a DMO gateway.

In some embodiments, DMO gateway 200 includes a proxy agent 202 that is configured to monitor the DMO gateway location in the network coverage area. The proxy agent is also configured to monitor a list of associated communication devices and to determine when at least one of these associated devices is operating in direct mode and outside of the network coverage area. Communication devices associated with DMO gateway 200 may be, for example, a network of peer communication devices.

Proxy agent 202 includes a monitoring component 204, a polling component 206, a reporting component 208 and a processing component 210. Monitoring component 204 monitors the DMO gateway RSSI to determine the location of DMO gateway 200 in the network coverage area. For example, monitoring component 204 may monitor the DMO gateway RSSI by evaluating the strength of signals received from associated network infrastructure devices. As DMO gateway 200 moves to a border area (a geographical area within a predefined distance from the boundary of the network coverage area), a value associated with the DMO gateway's RSSI will diminish. Therefore, in some embodiments, when DMO gateway 200 receives a predetermined number of signals with the RSSI at or below a predefined threshold, monitoring component 204 will determine that DMO gateway 200 is likely to be in the border area of the network coverage area. The predefined threshold is set based on an estimated probability that one or more associated communication devices are likely to be out of the network coverage area, although DMO gateway 200 is still in the network coverage area.

Proxy agent 202 is configured to determine if an associated communication device is operating in trunked or direct mode. In particular, polling component 206 is configured to continuously poll the associated communication device to determine when the associated communication device actually moves outside of the network coverage area. In some embodiments, polling component 206 sends TMO messages on a TMO channel to the associated communication device. As long as the associated communication device is responding to the TMO messages, polling component 206 is configured to determine that the associated communication device is operating in trunked mode. When the associated communication device fails to respond to a predefined number of TMO messages sent on the TMO channel, polling component 206 is configured to determine that the associated communication device is out of the network coverage area. Polling component 206 then sends DMO messages to the associated communication device on a DMO channel. As long as the associated communication device responds to the DMO messages, polling agent is configured to determine that the associated communication device is operating in direct mode.

When the associated communication device fails to respond to a predefined number of DMO messages, polling component 206 is configured to determine that the associated communication device is also out of a direct mode coverage area, and is thus inaccessible. As noted above, in some embodiments, the associated communication device may also switch to direct mode operation for reasons other than lack of network coverage.

In some embodiments, when the associated communication device is able to operate in trunked mode, the associated communication device is configured to receive a packet data message, a short data service message, or a status transmission service message on the TMO channel. When the associated communication device is able to operate in direct mode, the associated communication device is configured to receive a short data service message on the DMO channel. Therefore, polling component 206 may send TMO short data service messages to assess whether the associated communication device is out of the network coverage area. When the associated communication device fails to respond to a predefined number of TMO short data service messages sent through the network infrastructure, polling component 206 sends DMO short data service messages to the associated communication device to determine if the associated communication device is in the direct mode coverage area or if the associated communication device is out of both the network coverage area and the direct mode coverage area. Alternatively, polling component 206 may be configured to periodically interrogate a network component that receives periodic updates from the associated communication devices. Polling component 206 determines that an associated communication device is out of the network coverage area if that associated communication device failed to provide an update to the network component within a specified time period of when the at least one associated communication device was supposed to provide a latest of the periodic updates. It should be noted that polling component 206 may use other methods to determine if the associated communication device is operating in TMO mode, DMO mode, or is otherwise inaccessible.

Upon determining that at least one associated communication device is in the direct mode coverage area, proxy agent 202 is configured to dynamically activate DMO gateway functions. For example, proxy agent 202 may dynamically activate one or more processing components 210 which are configured to execute DMO gateway functions. In some embodiments, proxy agent 202 activates the DMO gateway functions when DMO gateway 200 is stationary. Proxy agent 202 may determine that DMO gateway 200 is stationary based on input from, for example, a global positioning system associated with DMO gateway 200 or an accelerometer or other sensor within DMO gateway 200 that determines movement of the DMO gateway 200. The activation is automatic, operating without user intervention so that a user need not manually activate the DMO gateway functions.

Reporting component 208 is configured to report presence information for each associated communication device to a central network component, such as a dispatch center. The presence information indicates whether or not each associated communication device is in the network coverage area, in the direct mode coverage area, or out of both the network coverage area and the direct mode coverage area, as determined by polling component 206. In particular, the presence information indicates if each associated communication device is operating in trunked mode within the network coverage area, in direct mode within the direct mode coverage area, or when the associated communication device is inaccessible. Reporting component 208 may send the presence information (and perhaps DMO frequency) to the central network component at predetermined intervals or the presence information can be sent upon request from the central network component. Reporting component 208 is configured to update presence information for each associated communication device when polling component 208 determines a change in the operating mode of an associated communication device.

Upon receiving the presence information, the central network component becomes aware of the status of each communication device allocated to DMO gateway 200. For example, the central network component may use the presence information to identify those communication devices allocated to DMO gateway 200 which are operating in direct mode. The central network component may thereafter send only DMO short data services to communication devices operating in direct mode. The central network component may also combine the presence information from all DMO gateways to determine how many DMO gateways are in a given location.

In some embodiments, DMO gateway functions will remain activated as long as at least one of the associated communication devices is operating in the direct mode. In these embodiments, when all associated communication devices are back in the trunked mode, DMO gateway 200 dynamically deactivates the DMO gateway functions and switches back to being a TMO device. In other embodiments, DMO gateway functions will remain activated as long as DMO gateway 200 is stationary. In these embodiments, when DMO gateway 200 detects its own movement while the DMO gateway functions are activated, DMO gateway 200 dynamically deactivates the DMO gateway functions and switches back to being a TMO device. DMO gateway 200 may detect its own movement by receiving a signal from an associated global positioning system or another sensor capable of detecting the DMO gateway movement. In other embodiments, when DMO gateway 200 detects its own movement while the DMO gateway functions are activated, DMO gateway 200 is configured to periodically check via, for example sending TMO short data service messages to associated DMO communication device(s), to determine when each communication device is back in TMO mode. In these embodiments, once all associated communication devices are back in TMO mode, DMO gateway 200 dynamically deactivates the DMO gateway functions and switches back to being a TMO communication device.

In some embodiments, the central network component may also combine the presence information from all DMO gateways and use that information in addition to other information, such as global positioning system information (which identifies the location of each gateway), to determine how many DMO gateways are in a given location. In some embodiments, the central network component may also send a broadcast message to all DMO gateways in the predefined geographical location to identify which DMO gateways are in operation in an area. The broadcast message may be sent to all DMO gateways periodically or upon the occurrence of an event. In response to the broadcast message, each gateway may provide its status information, such as the DMO frequency it is using and presence information for associated communication devices, to the central network component.

To manage DMO frequencies used by two or more DMO gateways and to avoid interference between two or more DMO gateways in a predefined geographical location, after receiving the responses, the central network component may transfer communication devices associated with a first DMO gateway to a second DMO gateway. As noted above, proxy agent 202 in each DMO gateway is also configured to monitor a list of associated communication devices and to determine when each of those associated devices are operating in direct mode and outside of the network coverage area. Therefore, in some embodiments, the central network component may transfer communication devices associated with the first DMO gateway to the second DMO gateway by sending a message with instructions for updating the list monitored by proxy agent 202. For example, the central network component may send a message to the first DMO gateway to delete communication devices associated with the first DMO gateway from the list monitored by the first DMO gateway. The central network component may simultaneously send a message to the second DMO gateway to add the communication devices that were previously associated with the first DMO gateway to the list monitored by the second DMO gateway. The central network component may thereafter send a message to the first DMO gateway to deactivate the first DMO gateway functions.

For example, if multiple DMO gateways in the geographical area attempt to use the same DMO channel within an interference distance, the central network component is configured to select one or more DMO gateways to provide DMO services to communication devices in the area. During the selection, DMO gateway functions in one or more DMO gateways may be activated or deactivated by the central network component. In particular, when the central network component transfers communication devices associated with the non-selected DMO gateways to the selected DMO gateway, the central network component may dynamically deactivate the DMO gateway functions on the non-selected DMO gateways, causing the non-selected DMO gateways to operate as trunked mode devices. The central network component may activate or deactivate the DMO gateway functions in the DMO gateways by sending a message to the processing component in the DMO gateway. The message may include instructions for activating or deactivating the DMO gateway functions. The processing component in the DMO gateway is therefore configured to execute commands from the central network component when it executes the instructions in messages sent from the central network component.

In some embodiments, when a data message is sent to a communication device, the central network component uses the received presence information to determine if the communication device is operating in trunked mode or direct mode. If the communication device is operating in trunked mode, the message is sent to the communication device via a data packet over a TMO channel. Although both packet data and short data messages may be sent over the TMO channel, in some embodiments, the packet data is sent over the TMO channel because the data packet can carry a large amount of data faster and more efficiently than a short data message. If the communication device is operating in direct mode, as determined from the presence information reported to the central network component, the central network component may direct that the message be sent to a network device, such as a server, where it is saved until the communication device returns to operating in TMO mode. In some embodiments, messages sent to the communication device include a status identifier. The status identifier may be used to indicate the message priority. If the status identifier indicates that the message has a high priority and if the communication device to whom the message is directed is operating in direct mode, the message itself may be sent to the communication device using a short data message over a DMO channel. This is because only the short data message can be sent over the DMO channel. In some embodiments, if the status identifier indicates that the message has a high priority and if the communication device is operating in direct mode, a warning message is sent instead of the message itself, using a short data message over the DMO channel. The warning message is used to inform the communication device that a message with a high priority is awaiting the communication device when it returns to trunked mode. This may be helpful in situations where a subscriber of the communication device has chosen to operate in direct mode for reasons other than being out of the network coverage area.

Figure 3:
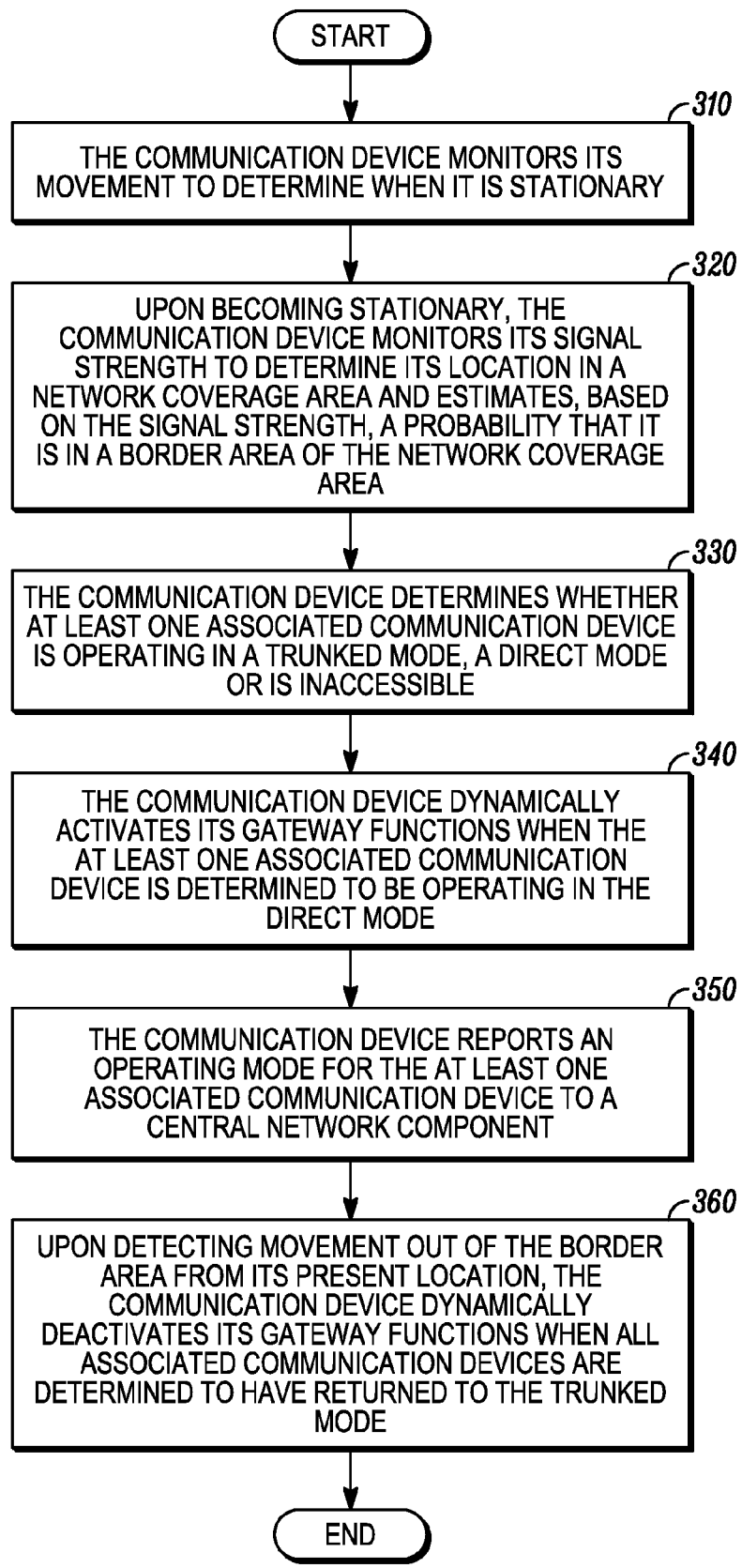
FIG. 3 is a flowchart of a method for dynamically activating gateway functions on a communication device which is operating in trunked mode in accordance with some embodiments.

FIG. 3 is a flowchart of a method for dynamically activating gateway functions on a communication device that is operating in trunked mode. In 310, the communication device monitors its movement to determine when it is stationary. In 320, upon becoming stationary, the communication device monitors its signal strength to determine its location in a network coverage area and estimates, based on the signal strength, a probability that it is in a border area of the network coverage area. In 330, the communication device determines whether at least one associated communication device is operating in a trunked mode, a direct mode or is inaccessible. In 340, the communication device dynamically activates its gateway functions when the at least one associated communication device is determined to be operating in the direct mode. The communication device is configured to function as a direct mode gateway for the at least one associated communication device when the gateway functions are activated. In 350, the communication device reports an operating mode for the at least one associated communication device to a central network component. In 360, upon detecting movement out of the border area from its present location, the communication device dynamically deactivates its gateway functions when all associated communication devices are determined to have returned to the trunked mode.

Thus, a communication device that acts as DMO/TMO gateway is presented. The device is able to automatically enable DMO gateway functions under certain conditions, such as being present at a predetermined geographical location, whether the device is stationary or moving, and/or whether an associated portable subscriber is estimated to be currently inside or outside TMO coverage. The device thus automatically switches between acting as a TMO mobile radio and as a DMO/TMO gateway. The device also maintains a database of presence information for associated devices for which it is able to act as the DMO gateway. This presence information is transmitted automatically or by polling to a central dispatcher, who then identifies devices operating as DMO gateways that are in operation within interference distance of each other and remotely controls whether each device continues to operate as a DMO gateway and on which channel the DMO gateway communicates. For example, only one gateway may be nominated to support DMO gateway service in a particular area. This allows network applications to tailor information delivery according to the services currently available to each device on TMO or DMO. This tailoring of delivery may be supported within a single agency or across multiple agencies depending on configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for dynamically activating gateway functions on a communication device operating in a trunked mode, comprising:
   calculating, by the communication device, an estimated probability that at least one associated communication device is out of a network coverage area;
   determining, by the communication device, that the at least one associated communication device is inaccessible or is operating in an operating mode consisting of a trunked mode or a direct mode when the estimated probability is calculated to be at or below a predefined threshold; and
   dynamically activating, by the communication device, gateway functions in the communication device upon determining that the at least one associated communication device is operating in the direct mode, wherein the communication device is configured to function as a direct mode gateway for the at least one associated communication device when the gateway functions are activated.

2. The method of claim 1, further comprising reporting, by the communication device, the operating mode of the at least one associated communication device to a central network component when there is a change in the operating mode of the at least one associated communication device.

3. The method of claim 1, further comprising dynamically deactivating gateway functions by the communication device upon at least one of detecting movement of the communication device or determining that all associated communication devices are in the network coverage area.

4. The method of claim 1, wherein the dynamically activating comprises activating gateway functions in the communication device when the communication device is determined to be stationary.

5. The method of claim 1, wherein the determining comprises sending trunked messages to the at least one associated communication device to determine when the at least one associated communication device moves out of the network coverage area, wherein the at least one associated communication device is determined to be out of the network coverage area when the at least one associated communication device fails to respond to a predefined number of the trunked messages; and
   sending direct messages to the at least one associated communication device to determine when the at least one associated communication device moves in a direct network coverage area, wherein the at least one associated communication device is determined to be out of the direct network coverage area when the at least one associated communication device fails to respond to a predefined number of the direct messages.

6. The method of claim 1, wherein the calculating comprises calculating, by the communication device, a signal strength associated with the communication device and determining from the signal strength that the communication device is at a border area of a network coverage area, wherein when the communication device is in the border area, the estimated probability is calculated to be at or below the predefined threshold.

7. The method of claim 1, wherein the determining comprises interrogating a network device that receives periodic updates from the at least one associated communication device and determining that the at least one associated communication device is out of the network coverage area if the at least one associated communication device failed to provide an update to the network device within a specified time period of when the at least one associated communication device was supposed to provide a latest of the periodic updates.

8. The method of claim 2, wherein the reporting comprises reporting the operating mode to the central network component at predetermined intervals or when the central network component requests a report of the operating mode.

9. The method of claim 2, wherein the central network component is configured to use reported operating modes to identify each communication device operating as a direct mode gateway, to remotely control whether the communication device continues to operate as the direct mode gateway, and to remotely control a direct mode channel on which the communication device transmits information.

10. The method of claim 2, wherein the central network component is configured to use reported operating modes to tailor information delivery according to services currently available to each communication device dependent on its operating mode.

11. The method of claim 2, wherein the central network component is configured to use reported operating modes to determine whether to forward or queue messages directed to the at least one associated communication device.

12. The method of claim 2, wherein the central network component is configured to:
combine operating mode reports from two or more communication devices to identify communication devices with activated gateway functions in a given location; and
dynamically enable or disable the gateway functions in the two or more communication devices dependent on the operating modes of the two or more communication devices to avoid interference between the two or more communication devices.

13. A communication device configured to dynamically activate direct mode gateway functions while operating in a trunked mode, the communication device comprising:
a monitoring component configured to calculate an estimated probability that at least one associated communication device is out of a network coverage area;
a polling component configured to determine that the at least one associated communication device is inaccessible or is operating in an operating mode consisting of a trunked mode or a direct mode when the estimated probability is calculated to be at or below a predefined threshold; and
a processing component configured to dynamically activate gateway functions in the communication device when the at least one associated communication device is determined to be operating in the direct mode, wherein the communication device is configured to function as a direct mode gateway for the at least one associated communication device when the gateway functions are activated.

14. The communication device claim 13, further comprising a reporting component configured to report the operating mode of the at least one associated communication device to a central network component when there is a change in the operating mode of the at least one associated communication device.

15. The communication device claim 13, wherein the processing component is configured to dynamically deactivate gateway functions in the communication device upon at least one of detecting movement of the communication device or determining that all associated communication devices are in the network coverage area.

16. The communication device claim 13, wherein the processing component is configured to dynamically activate gateway functions in the communication device when the communication device is determined to be stationary.

17. The communication device claim 13, wherein the polling component is configured to perform at least one of:
send trunked messages to the at least one associated communication device to determine when the at least one associated communication device moves out of the network coverage area, wherein the at least one associated communication device is determined to be out of the network coverage area when the at least one associated communication device fails to respond to a predefined number of the trunked messages;
send direct messages to the at least one associated communication device to determine when the at least one associated communication device moves in a direct network coverage area, wherein the at least one associated communication device is determined to be out of the direct network coverage area when the at least one associated communication device fails to respond to a predefined number of the direct messages; or
interrogate a network device that receives periodic updates from the at least one associated communication device and to determine that the at least one associated communication device is out of the network coverage area if the at least one associated communication device failed to provide an update to the network device within a specified time period of when the at least one associated communication device was supposed to provide a latest of the periodic updates.

18. The communication device claim 13, wherein the reporting component is configured to report the operating mode to the central network component at predetermined intervals or when the central network component requests a report on the operating mode.

19. The communication device claim 13, wherein the communication device is configured to provide a response to a broadcast message sent from the central network component, the response including a direct mode frequency and operating modes for associated communication devices, the broadcast message is used by the central component to identify all communication devices with activated gateway functions in a given location.

20. The communication device claim 13, wherein the processing component is configured to dynamically activate or deactivate gateway functions in the communication device based on instructions from the central network component.

* * * * *